United States Patent [19]
Yamamoto

[11] Patent Number: 5,740,893
[45] Date of Patent: Apr. 21, 1998

[54] ONE-WAY CLUTCH AND METHOD OF MAKING BEARING RING

[75] Inventor: Ken Yamamoto, Iwata, Japan

[73] Assignee: NTN Corporation, Osaka, Japan

[21] Appl. No.: 657,165

[22] Filed: Jun. 3, 1996

[30] Foreign Application Priority Data

| Jul. 14, 1995 | [JP] | Japan | 7-178542 |
| Jul. 26, 1995 | [JP] | Japan | 7-190595 |
| Aug. 25, 1995 | [JP] | Japan | 7-217411 |
| Aug. 29, 1995 | [JP] | Japan | 7-220084 |
| Aug. 31, 1995 | [JP] | Japan | 7-223215 |

[51] Int. Cl.⁶ .................................. F16D 41/064
[52] U.S. Cl. ...................... 192/45; 384/505; 29/416; 29/898.066
[58] Field of Search .................... 192/45; 188/82.84; 29/416, 898.066; 384/499, 502, 503, 505, 516, 492, 907

[56] References Cited

U.S. PATENT DOCUMENTS

| 1,942,909 | 1/1934 | Von Thüngen | 192/45 |
| 3,730,316 | 5/1973 | Zimmer | 192/45.1 X |
| 3,760,914 | 9/1973 | Gelbrich | 192/45 |
| 3,805,932 | 4/1974 | Ernst et al. | 192/45 |
| 3,978,566 | 9/1976 | Ladin | 29/898.066 |
| 5,261,159 | 11/1993 | Yasuda et al. | 29/898.066 |

FOREIGN PATENT DOCUMENTS

| 403423 | 4/1943 | Italy | 192/45 |
| 55-94201 | 7/1980 | Japan | 29/416 |

*Primary Examiner*—Richard M. Lorence
*Attorney, Agent, or Firm*—Nikaido, Marmelstein, Murray & Oram LLP

[57] ABSTRACT

An outer ring 3 along a bearing centerline of the bearing outer ring of a standard deep groove ball bearing, and the bottom of the raceway surface $3b1$ is formed with a circumferential groove $3b2$. A retainer $3d$ is fitted in the circumferential groove $3b2$ of the outer ring $3b$. The retainer $3d$ is in the form of a split ring having a single split and has a cam surface on the wall surface on the pocket side.

11 Claims, 11 Drawing Sheets

5,740,893

ONE-WAY CLUTCH AND METHOD OF MAKING BEARING RING

BACKGROUND OF THE INVENTION

The present invention relates to a one-way clutch which transmits/interrupts torque in one direction.

Generally, a one-way clutch of mechanical type comprises an inner member, an outer member, and a plurality of torque transmitting members interposed between the inner member and the outer member, the arrangement being such that torque is transmitted or interrupted between the inner and outer member through engagement/disengagement of the torque transmitting members with respect to the inner and outer member. Such clutches are classified into two types, one using balls or rollers and the other using sprags as torque transmitting members. In the former type, cam surfaces are formed on an outer periphery of the inner member or on an inner periphery of the outer member and the balls (or rollers) are engaged with or disengaged from unidirectional wedge clearances defined the cam surfaces and the other member, and in the latter type, sprags having cam surfaces have their inclination controlled for engagement with and disengagement from the outer periphery of the inner member and the inner periphery of the outer member. In each type of clutch, at the time of torque interruption, the torque transmitting members are made free, as they are disengaged from the inner and outer member; therefore, the clutch itself has no function of supporting radial loads, and is usually used in combination with a radial bearing. However, such arrangement using a combination of a one-way clutch and a radial bearing increases in axial dimension, weight and cost, so that it is disadvantageous for applications which have severe limitations of size, weight and cost.

SUMMARY OF THE INVENTION

The present invention is intended to solve the above problems by providing a one-way clutch having both the function of a one-way clutch and the function of a rolling bearing.

A one-way clutch according to the present invention comprises an inner member having a raceway surface formed on an outer periphery thereof, an outer member having a raceway surface formed on an inner periphery thereof, a plurality of rolling elements interposed between the raceway surfaces, and a retainer having a unidirectional cam surface, wherein in one direction, the inner and outer members are relatively rotated while supporting a load through the rolling elements,and in the other direction, the inner and outer members are locked together through an engagement between the rolling elements and the cam surface of the retainer.

The retainer is disposed on the raceway surface of one of the inner and outer members, and have a cam surface cooperating with the raceway surface of the other member to define a wedge clearance in one direction.

The retainer may be in the form of a ring having at least one split or in the form of partial rings circumferentially put together.

The retainer may be fitted in a circumferential groove formed in the raceway surface of one member, or the raceway surface of one member may have a shape to make angular contact with the rolling element at two points and a space in which the retainer is disposed may be defined between the bottom of the raceway surface of the one member and the rolling element.

The retainer may comprise an annular element fitted on the raceway surface of one member, a plurality of pillar portions extending from the annular element to the raceway surface of the other member, pockets each surrounded by the annular element and the circumferentially adjacent pillar portions and adapted to receive the rolling element, and a cam surface formed on a wall surface of the annular element on the pocket side and cooperating with the raceway surface of the other member to define a wedge clearance in one direction.

The one rotatable member may be bisected in a section which is orthogonal to the axis, and in the case where the one member is the outer member, such bisected outer member may be held by a retaining ring.

The retainer may be made of synthetic resin, and the rolling elements may be made of ceramic material. Further, components of a rolling bearing may be used as the inner member, outer member and rolling elements.

In producing a bearing ring as the one member, it is advisable to use a method of producing a bearing ring blank being drawn a longitudinal section of the raceway surface thereof with a single shpherical surface having a radious of curvature greater by a predetermined amount than a radius of a ball serving the rolling element, and having a width greater by a predetermined amount than the width of the complete bearing ring.

And then, bisecting the bearing ring blank along a widthwise centerline thereof; and cutting a split surface of each divisional part by an amount corresponding to the predetermined amount.

The one-way clutch of the present invention is relatively simple in construction and yet has both the function of a one-way clutch and the function of a rolling bearing; therefore, as compared with the conventional arrangement using a radial bearing as well, the inventive arrangement achieves decreases in axial dimension, weight and cost, and is suitable particularly for applications having severe limitations of size, weight and cost.

Further, standard bearing rings can be used as the inner and outer members either intact or by applying more or less processing thereto; this is very advantageous from the standpoint of cost.

DESCRIPTION OF THE PREFERRED EMBODIMENTS

The present invention will now be described with reference to embodiments in which the invention is applied to a one-way clutch used in an alternator pulley for automobiles.

Figure 1A:
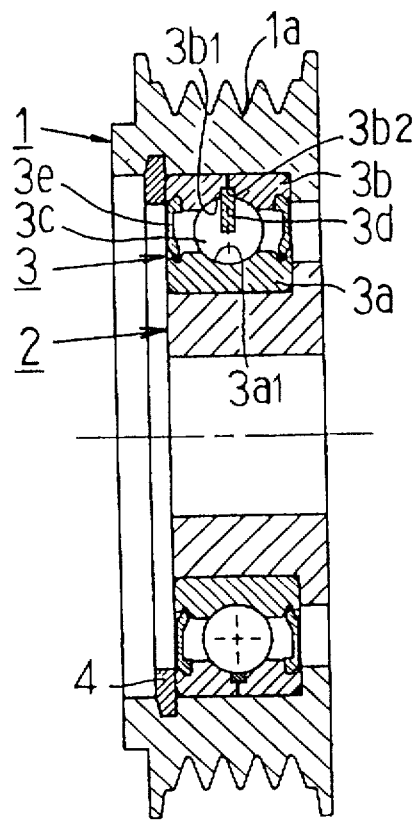
FIG. 1 is a longitudinal sectional view (FIG. a) of an alternator pulley according to the present invention and a cross sectional view (FIG. b) of a one-way clutch.
Figure 1B:
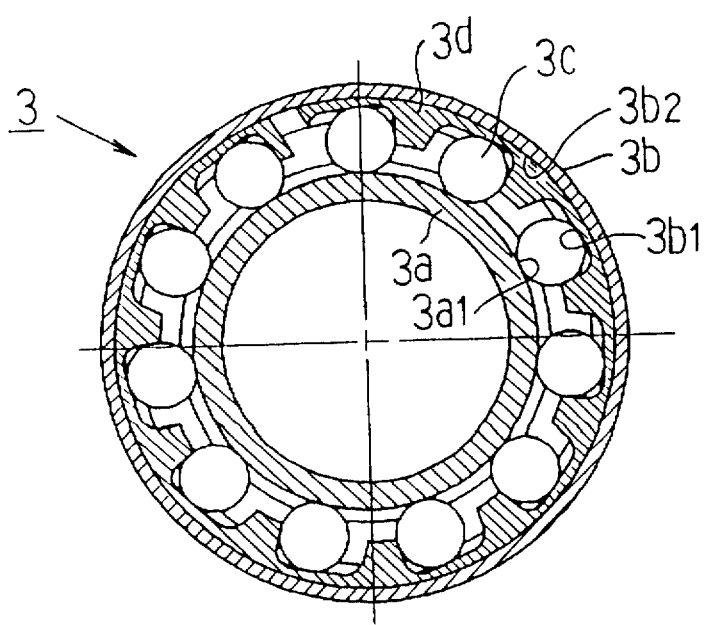

An alternator pulley shown in FIG. 1 comprises a pulley body having belt engaging grooves 1a formed in an outer periphery thereof, and a one-way clutch 3 interposed between the pulley body 1 and a shaft sleeve 2, the arrangement being such that it receives the rotative power from a crank shaft of a engine through a transmission belt and delivers it to a unillustrated alternator input shaft (inserted in the shaft sleeve 2). As will be later described, the one-way clutch 3 functions to prevent slippage of the transmission belt due to variations in the angular velocity of the driving side (crank shaft side,) variations in the peripheral speed of the transmission belt produce a difference in peripheral speed between it and the inertial rotation of the driven side to make the slippage thereof occur, and suppress wear in the transmission belt.

The one-way clutch 3 comprises an inner ring 3a fitted on an outer peripheral surface of the shaft sleeve 2, an outer ring 3b fitted on an inner periphery of the pulley body 1, a plurality of balls 3c interposed between the raceway surface 3a1 of an inner ring 3 and a raceway surface 3b1 of an outer ring 3b, a retainer 3d, and a pair of seal members 3e attached in opposite ends of the outer ring 3. The outer ring 3b is fixed in place against slip-off by a stop ring 4 fitted on the inner periphery of the pulley body 1.

In this embodiment, the outer ring 3b is constructed by bisecting a bearing outer ring of a standard deep groove ball bearing along a bearing centerline and forming a circumferential groove 3b2 in a bottom of the raceway surface 3b1. The purpose of making the outer ring 3b in two-part construction is to make it easier to install the balls 3c between the raceway surfaces 3a1 and 3b1, and the purpose of forming the circumferential groove 3b2 in the raceway surface 3b1 is to install the retainer 3d as described below.

Further, an inner bearing ring of the standard deep groove ball bearing is used as the inner ring 3a intact.

Figure 2:
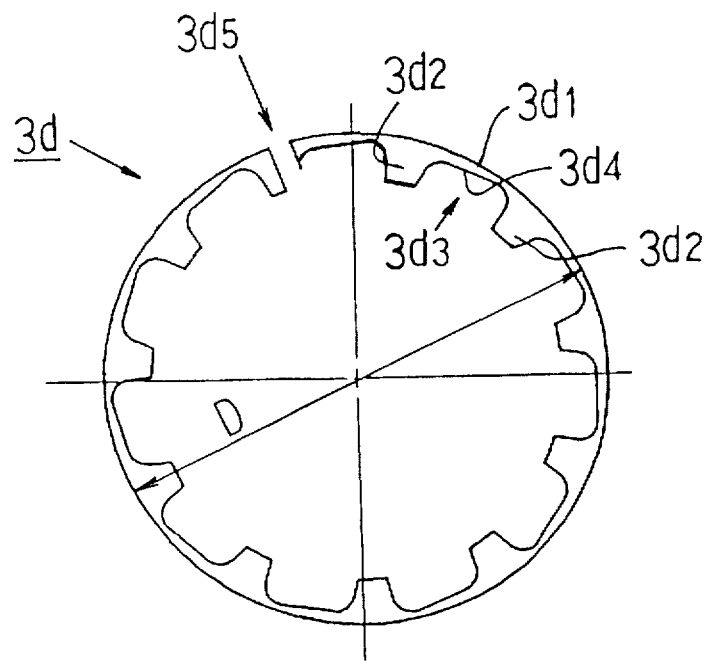
FIG. 2 is a side view of a retainer.

As shown in FIG. 2, the retainer 3d comprises an annular portion 3d1 suitably mounted in the circumferential groove 3b2 of the outer ring 3b, a plurality of pillar portions 3d2 continuously extending radially inward from the annular portion 3c1, pockets 3d3 each delimited by the annular portion 3d1 and two circumferentially adjacent pillar portions 3d2, and cam surfaces 3d4 formed on a wall surface of the annular portion 3d1 on the pocket side. Further, in this embodiment, the retainer 3d is a one-split ring having a single split 3d5, so designed that when the split ring is subjected to an external force from the inner or outer diameter side, it is freely expanded or contracted, but when the external force is removed, it is elastically restored to the original state. The outer diameter D of the retainer 3d in its free state is of the same order as the groove bottom diameter of the circumferential groove 3b2 of the outer ring 3b. The term "same order" includes two cases (1) where it is seemingly the same (within the range of manufacturing error) and (2) where it is slightly smaller. The width of the retainer 3d is preferably made somewhat smaller than the width of the circumferential groove 3b2.

Figure 3:
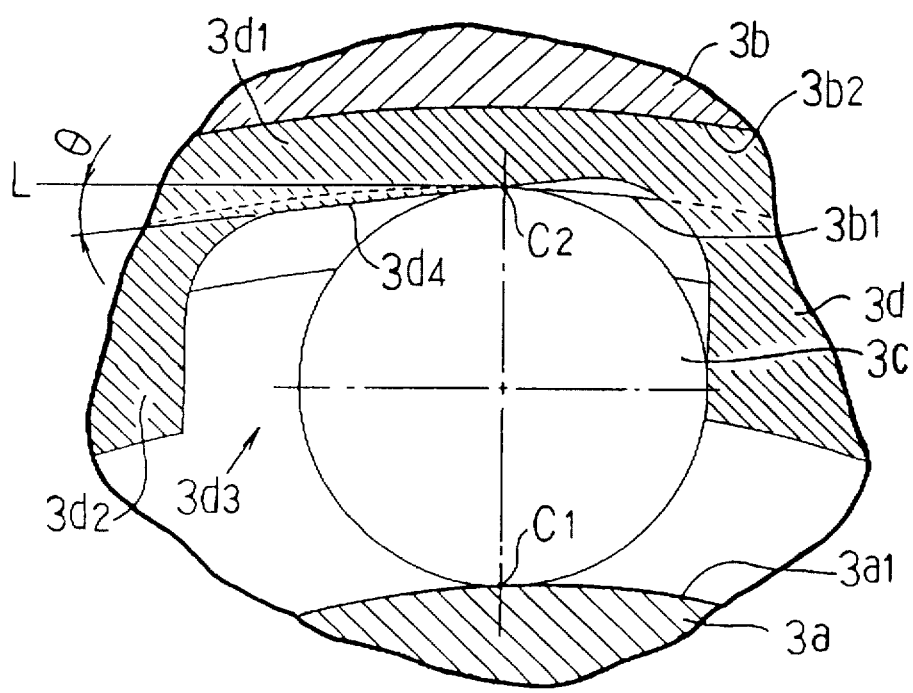
FIG. 3 is an enlarged sectional view showing the peripheral region around a cam surface in FIG. 1.

As shown enlarged in FIG. 3, the cam surface 3d4 of the retainer 3d is a taper surface inclined at an angle θ with respect to a tangent L at a point of contact C1 of the ball 3c with the raceway surface 3a1 (point of contact c2 with the raceway surface 3b1). The angle of inclination θ is preferably set on the basis of the common value in one-way clutches. Since the cam surface 3d4 has such shape, there is defined a wedge clearance between the cam surface 3d4 and the raceway surface 3a1 which decreases in one direction (counterclockwise direction as seen in the same figure).

FIG. 3 shows the state in which the ball 3c is disengaged from the wedge clearance, in which state the ball 3c is rolling while contacting the raceway surfaces 3a1 and 3b1 at the points C1 and C2, serving as the usual bearing rolling element. Therefore, torque transmission between the outer and inner rings 3b and 3a is interrupted, leaving the outer ring 3b running idle with respect to the inner ring 3a.

At the same time, the radial load from the outer ring 3b is supported by the plurality of balls 3c. On the other hand, when the ball 3c presses the cam surface 3d4 as it moves counterclockwise relative to the retainer 3d from the state shown in the same figure, the retainer 3d slightly increases in diameter, so that the wall surface (outer diameter D) of the annular portion 3d1 on the side opposite to the pockets presses the groove bottom of the circumferential groove 3b2. And as the ball 3e further relatively moves (or tries to relatively move) counterclockwise from this state, it fully engages with the wedge clearance defined between the cam surface 3d4 and the raceway surface 3a1, and the Inner and outer rings 3a and 3b are locked together through the ball 3c. Thereby, the torque from the outer ring 3b is transmitted in the course outer ring 3b→ retainer 3d→ ball 3c→ inner ring 3a, so that the inner ring 3a rotates together with the outer ring 3b.

This one-way clutch 3 is of the arrangement in which engagement and disengagement of the balls 3c with respect to the wedge clearance is automatically effected by the rotation of the retainer 3d concomitant with the rotation of the outer ring 3b. As described above, the outer diameter D in the free state of the retainer 3d (in which state the retainer is subjected to no force from the balls 3c) is of the same order as the groove bottom diameter of the circumferential groove 3b2. Therefore, when the outer ring 3b is rotated, the retainer 3d is concomitantly rotated as it receives a force directed in the direction of rotation from the outer ring 3b owing to the frictional force due to the contact between the annular portion 3d1 and the circumferential groove 3b2, the viscosity of the oil films formed between the annular portion 3d1 and the circumferential groove 3b2, or the like. For example, In FIG. 3, when the outer ring 3b is rotated counterclockwise, the retainer 3d is concomitantly rotated counterclockwise as it is drawn by the rotation of the outer ring 3b. Therefore, the ball 3c is moved clockwise relative to the retainer 3d and disengaged from the wedge clearance to interrupt the torque transmission. When the direction of rotation of the outer ring 3b is changed from this state to the clockwise direction, the retainer 3d is concomitantly rotated clockwise as it is drawn by the rotation of the outer ring 3b. Therefore, the ball 3c is moved counterclockwise relative to the retainer 3d to engage the wedge clearance, thus transmitting the torque. That is, the change of the direction of rotation of the outer ring 3b relative to the inner ring 3a automatically shifts the clutch between torque transmission and interruption.

To describe the above action with respect to an alternator pulley, when the peripheral speed of the transmission belt is decreased attending the decrease in the angular velocity of the crank shaft, the input rotation of the outer ring (the driving side) slightly lags behind the inertial rotation of the inner ring (the driven side). At this time, if the inner and outer rings are interconnected, the input is reversely fed from the inner ring to the outer ring, forming a gap between the peripheral speed of the transmission belt and the rotation of the pulley body, whereby the transmission belt would slip relative to the pulley body. The one-way clutch 3 interrupts the torque transmission between the outer and inner rings 3b and 3a during such delayed rotation, i.e., counterclockwise relative rotation, of the outer ring, so as to allow the outer ring 3b to run idle (interrupt the reverse input from the inner ring 3a), thereby preventing slippage due to the decrease in the peripheral speed of the transmission belt and hence performing the function of suppressing wear thereof. During interruption of torque, the one-way clutch 3 functions as a rolling bearing, performing the function of supporting the belt load from the transmission belt. When the outer ring 3b, from this state, is rotated clockwise relative to the inner ring 3a, the clutch 3 is automatically switched to torque transmission. That is, the peripheral speed change of the transmission belt attending the angular velocity change of the crank shaft results in automatic switching between torque transmission and interruption.

In addition, the switching response of the one-way clutch depends on the concomitant rotation of the retainer 3d, the shape (including angle of inclination θ etc.) of the cam surface 3d4, and the clutch clearance, or the like; therefore, it is preferable that these factors be set at optimum values according to the service conditions.

Figure 4:
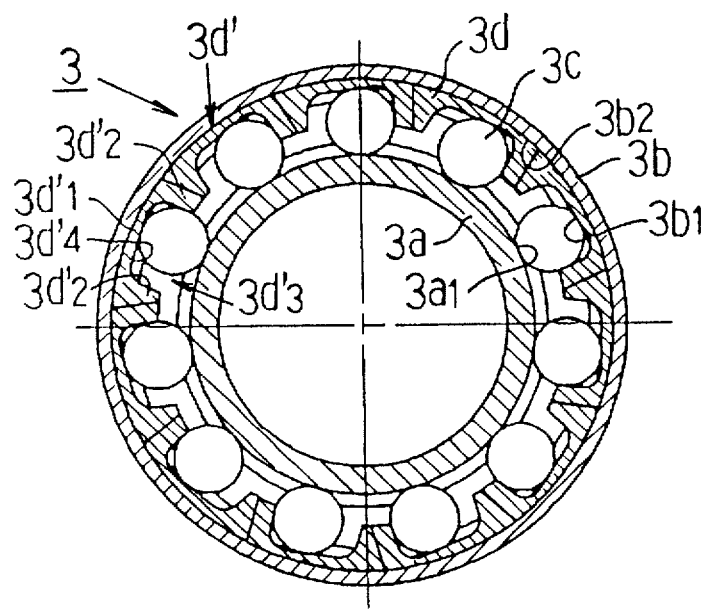
FIG. 4 is a cross sectional view of a one-way clutch according to another embodiment of the present invention.

In an embodiment shown in FIG. 4, the retainer 3d is constructed by circumferentially putting together a plurality of partial rings 3d'. Each partial ring 3d' comprises an arcuate portion adapted to be fitted in the circumferential groove 3b2 of the outer ring 3b, two pillar portions 3d'2 extending radially inward from the annular portion 3d'1, a pocket delimited by the annular portion 3d'1 and two pillar portions 3d'2, and a cam surface 3d'3 formed on the wall surface of the annular portion 3d' on the pocket side. When each partial ring 3d' is pushed by the ball 3c, it is slightly moved, so that the wall surface of the annular portion 3d'1 on the pocket side is pressed against the groove bottom of the circumferential groove 3b2. The rest of the basic functions and effects are the same as in the preceding embodiment, and a description thereof is omitted.

Figure 5A:
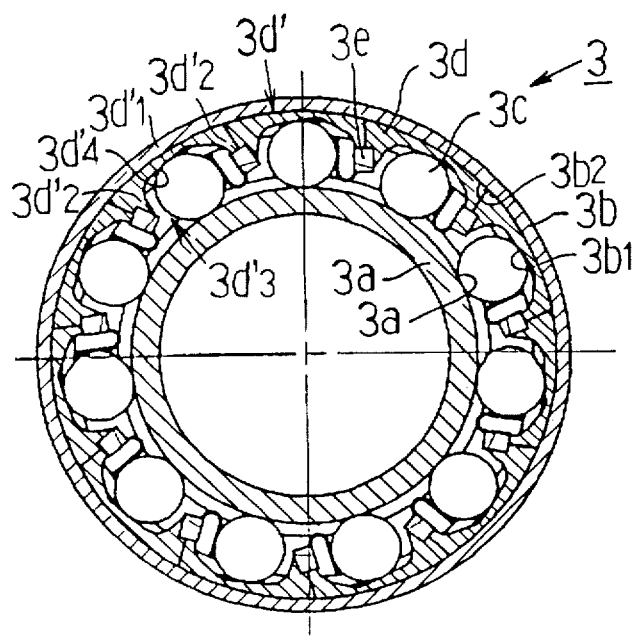
FIG. 5 is a cross-sectional view (FIG. a) of a one-way clutch according to another embodiment of the present invention and a perspective view (FIG. b) of a spring member.
Figure 5B:
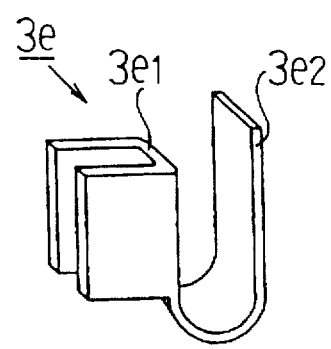

An embodiment shown in FIG. 5 is constructed such that in the arrangement shown in FIG. 4, a spring member 3e is mounted on the pillar portion 3d'2 of each partial ring 3d' on the side opposite to the wedge clearance side. Each spring member 3e comprises a U-shaped mounting portion 3e1 adapted to be mounted on the pillar portion 3d'2, and a tongue portion 3e2 bent and integrally extending from the mounting portion 3e1. The tongue portion 3e1 of the spring member 3e is in constant contact with the ball 3c to press the latter toward the wedge clearance side; thus, as compared with the arrangement shown in FIG. 4, the response for switching to torque transmission is better.

Figure 6:
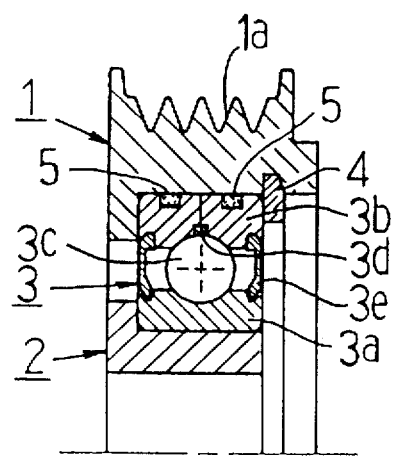
FIG. 6 is a longitudinal sectional view (FIG. a) of an alternator pulley according to another embodiment of the invention.

In an embodiment shown in FIG. 6, seal members, e.g., O-rings 5, are interposed between the outer periphery of the outer ring 3b and the inner periphery of the pulley body 1. The O-rings 5 are fitted in annular grooves formed in the outer periphery of the outer ring 3b and are disposed one on each side of the split in the outer ring 3b. This embodiment is effective in preventing a lubricant from leaking from the split in the outer ring 3b.

Figure 7:
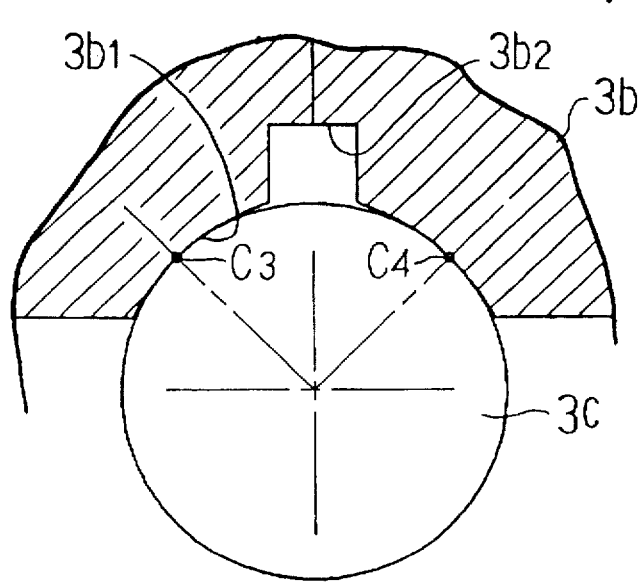
FIG. 7 is an enlarged sectional view showing the outer ring raceway surface of a one-way clutch according to another embodiment of the Invention.

In FIG. 7, the raceway surface 3b1 of the outer ring 3b is made in the form of Gothic arch. The ball 3c makes angular contact with the raceway surface 3b1 at two points C3 and C4, but does not contact the bottom portion of the race way surface 3b1 which is formed with the circumferential groove 3b2. During rotation, since the ball 3c does not contact the inlet edge of the circumferential groove 3b2, this arrangement is effective as means for improving durability.

Figure 8A:
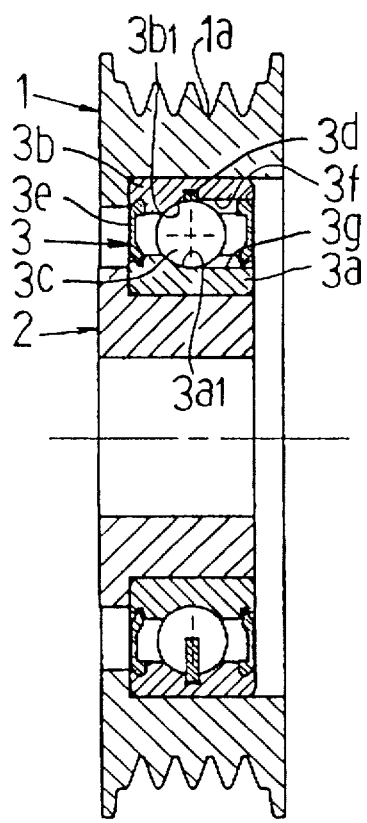
FIG. 8 is a longitudinal sectional view (FIG. a) of an alternator pulley according to another embodiment of the invention and a cross sectional view (FIG. b) of a one-way clutch.
Figure 8B:
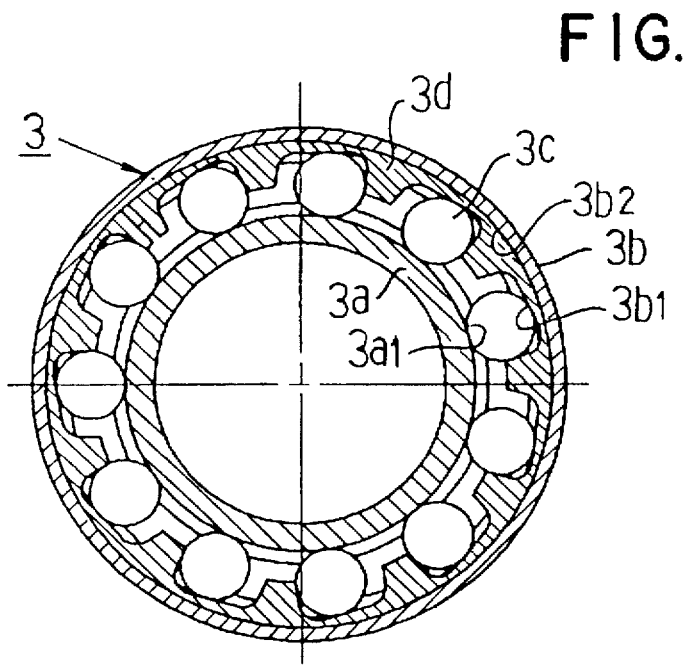

In an embodiment shown in FIG. 8, the inner and outer rings 3a and 3b are formed with insert grooves 3g and 3f, respectively. The Insert groove 3g communicates at one end surface of the outer ring 3b with the raceway surface 3a1, while the insert groove 3f communicates at one end surface of the outer ring 3b with the raceway surface 3b1. Balls 3c can be inserted into the space between the raceway surfaces 3a1 and 3b1 from the insert grooves 3g and 3f. Therefore, the outer ring 3b in this embodiment is not of the two-piece construction described above but of the one-piece construction.

Figure 9A:
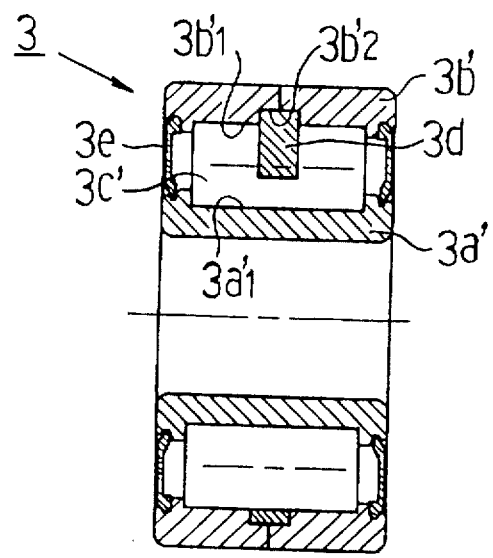
FIG. 9 is a longitudinal sectional view (FIG. a) and a cross sectional view (FIG. b) of a one-way clutch according to another embodiment of the invention.
Figure 9B:
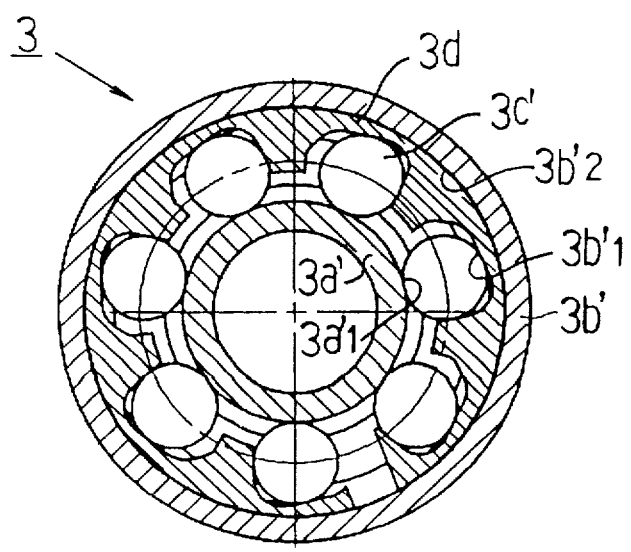

In an embodiment shown in FIG. 9, rollers 3c' are used as rolling elements. The outer ring 3b' is constructed by bisecting a bearing outer ring of a standard roller bearing along bearing centerline, and the raceway surface 3b1 is formed with a circumferential groove 3b'2. The circumferential groove 3b'2 is located substantially in the center of the raceway surface 3b'1 and is wider than in the case of the above-described embodiment, with the width of the retainer 3d being correspondingly increased. Therefore, it is possible to expect an increased radial load capacity due to the use of rollers 3c' as rolling elements, and an increased brake torque capacity due to the increased strength of the retainer 3d. In addition, the bearing inner ring of the standard roller bearing is used intact as the inner ring 3a'.

Figure 10:
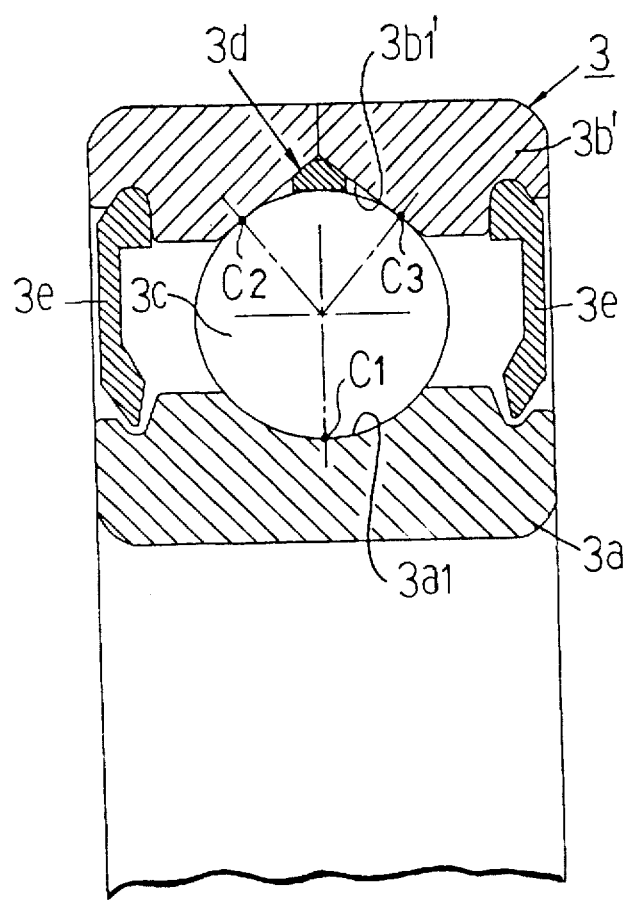
FIG. 10 is a longitudinal sectional view of a one-way clutch according to another embodiment of the present invention.

In an embodiment shown in FIG. 10, the raceway surface 3b'1 is in the form which makes angular contact with the ball 3c at two points C2 and C3, and a space in which the retainer 3d is placed is defined between the bottom of the raceway surface 3b'1 and the ball 3c. In this embodiment, the outer ring 3b'1 is in the form of a bearing outer ring of a ball bearing being bisected along bearing centerline and includes two flat surfaces which are continuous with each other at the bottom. The raceway surface 3b'1 may be in the form of a Gothic arch, parabola, or hyperbola. As compared with the embodiments described above, since the circumferential groove in the raceway surface can be omitted, this leads to simplification of the manufacturing process. In addition, a bearing inner ring of a standard deep groove ball bearing is used intact as the inner ring 3a.

Figure 11:
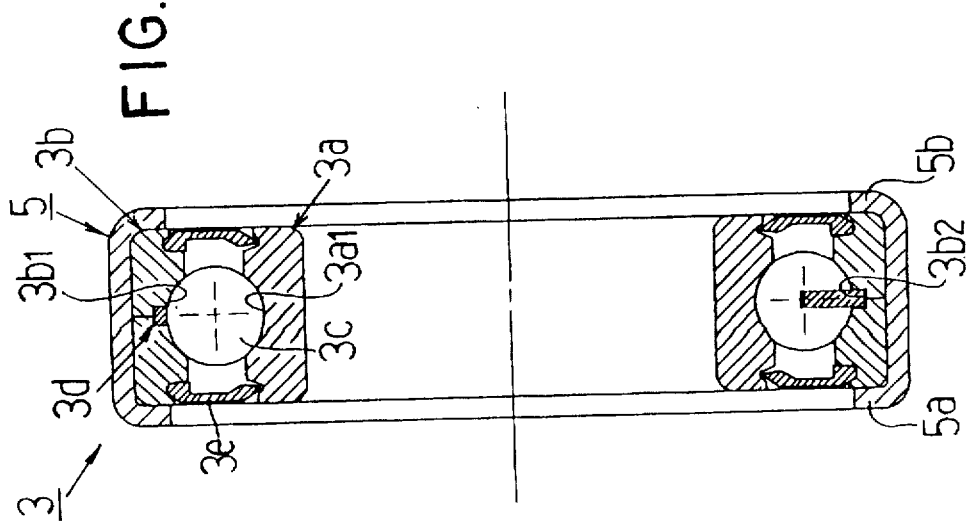
FIG. 11 is a longitudinal sectional view of a one-way clutch according to another embodiment of the present invention.

In an embodiment shown in FIG. 11, a bisected outer ring 3b is held by a retaining ring 5. The assembling operation comprises the steps of installing the balls 3c and the retainer 3d between the inner and outer rings 3a and 3b, fitting the retaining ring 5 on the outer periphery of the outer ring 3b, and crimping one or both ends of the retaining ring 5 into the end surface of the outer ring 3b for assembly. In this embodiment, a flange 5e is formed in advance on the other end of the retaining ring 5, and after the retaining ring 5 has been fitted on the outer periphery of the outer ring 3b, one end alone is crimped to form a flange 5b. In addition, in the case where the sufficient retaining force is obtained by only fitting (under pressure) the retaining ring 5 on the outer periphery of the outer ring 3b, the aforesaid crimping operation may be omitted. In that case, the retaining ring 5 may be made in a single-flanged or flangeless form. Thanks to the construction in which the clutch elements, such as the bisected outer ring 3b, the inner ring 3a, the balls 3c and the retainer 3d, are assembled by the retaining ring 5, the assembly is convenient for handling.

Figure 12A:
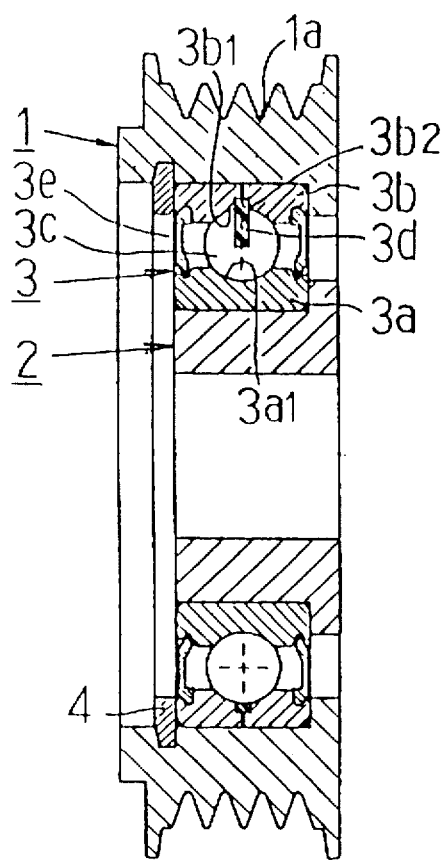
FIG. 12 is a longitudinal sectional view (FIG. a) of an alternator pulley according to another embodiment of the invention and a cross sectional view (FIG. b) of a one-way clutch.
Figure 12B:
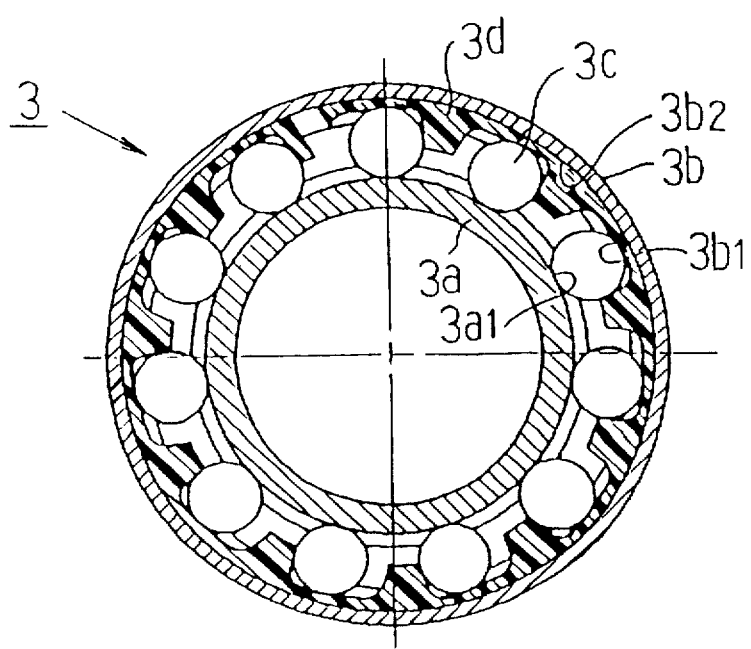

In an embodiment shown in FIG. 12, the retainer 3d which is one of the main elements of the aforesaid clutch is formed of a synthetic resin. As for synthetic resins for forming the retainer 3d, use may be made, for example, of thermoplastic resins such as polyamide (PA), polyacetal (POM), polyethersulfone (PES), polyetheretherketone (PEEK), polyamideimide (PAI), polyetherimide (PEI), polyphenylenesulfide (PPS), and thermoplastic polyimide, and thermosetting resins such as phenol resin, and totally aromatic polyimide (PI). However, in consideration of (1) superiority in mechanical properties, wear characteristics and thermal characteristics, from the standpoint of durability, (2) possession of sufficient elasticity to expect the amount of diametrical expansion and contraction which is necessary as a clutch element in the case where the retainer 3d is made as a complete (having no split) ring, (3) desirable possession of good slide characteristics since sliding in contact with the circumferential groove 3b2 is expected during idle running, and (4) the material being desirably inexpensive and superior in easy formability from the standpoint of saving the manufacturing cost, of these synthetic resins it is considered that polyamide resin (PA) and polyetheretherketone resin (PEEK) are preferable. Of these, polyamide resin (PA) is particularly preferable. As for polyamides, use may be made, for example, of polyamide 6, polyamide 6-6, polyamide 4-6, polyamide 6-10, polyamide 6-12, polyamide 11, and polyamide 12.

Further, in order to further improve slide characteristics, said polyamide resin may be impregnated with fluorine type resin or the like. As for fluorine type resins, use may be made of polytetrafluoroethylene resin PTFE), tetrafluoroethylene—perfluoroalkylvinylether copolymer (PFA), tetrafluoroethylene—hexaphloropropylene copolymer (FEP), tetrafluoroethylene—ethylene copolymer (ETFE), polychlorotriphloroethylene resin (PCTFE), and polyvinylfluoride resin (PVF), of which PTFE, PFA, FEP, and ETFE are desirable, and particularly PFE, which has the lowest friction coefficient (dynamic friction coefficient being 0.10) is particularly desirable.

Further, within the range which does not impair the effects of the invention, various fillers may be added. As for such fillers, use may be made of reinforcing materials, such as glass fiber, carbon fiber, aramid fiber, calcium titanate whiskers, wollastonite, aluminum borate whiskers, and calcium sulfate whiskers, inorganic powders, such as molybdenum bisulfide, graphite, carbon, calcium carbonate, talc, mica, kaolin, iron oxide, glass beads and phosphates, resin powders, such as polyimide resin, aromatic polyester resin, polyether ketone resin, polyphenylene sulfide resin, and silicone resin, internal lubricants, such as silicone oil, fluorine oil, wax, and stearates.

As for the methods of producing said polyamide resins, it is possible to employ various known molding methods, such as injection molding, extrusion molding, and monomer casting; however, injection molding is desirable, in consideration of its low cost and operating efficiency. Further, molding may be followed by heat treatment and refining treatment. This heat treatment is performed to mitigate residual stress in the molding, and to improve dimensional stability, crystallization and mechanical characteristics. As for the heat treating agent, use may be made of water, liquid paraffin, and hardening oil. The refining treatment is a treatment which forces the molding to absorb the equilibrium amount of water in a short time in order to improve dimensional stability. It is advisable to use boiling water or an aqueous solution of potassium acetate for refining treatment. Further, after molding, grinding may be applied to the outer and inner peripheral surfaces.

As for the synthetic resin for forming the retainer 3d, use may be made of copna resin, besides the synthetic resins exemplified above. Herein, the "copna resin" is a thermosetting resin prepared by crosslinking a polycyclic aromatic hydrocarbon, such as naphthalene, anthracene, phenanthrene, pyrene or coal tar pitch, by paraxylylene glycol in the presence of an acid catalyst. The reaction proceeds in the form of a parent electron substitution reaction involving dehydration, forming a structure in which a number of condensed polycyclic aromatic nuclei are connected together by benzyl type bonds, the product being named "Condensed Polynuclear Aromatic Resin". With the lined characters put together, it is abbreviated to "COPNA resin".

Besides the synthetic resins exemplified above, it is possible to employ synthetic resins having the same or superior properties (slide characteristics, mechanical characteristics, etc.) as or to the above-mentioned synthetic resins.

Forming the retainer 3d of a synthetic resin improves processing and reduces cost. Particularly, forming the retainer 3d by injection molding is very advantageous from the standpoints of processing, cost, and mass production, and in this case since there is no shearing of the material as compared with the case of forming it by machining, the cam surface can be smoothly finished and the torque transmitting and interrupting function is stabilized. Further, since there is no cutting-in phenomenon (biting phenomenon) occurs between the balls 3 and the cam surface of the retainer 3d, reliable clutch function is ensured. Further, the shocks which occur upon sudden switching to torque transmission and the vibrations which are transmitted through the inner ring 3a, outer ring 3b, and balls 3c are absorbed by the elasticity of the retainer 3d made of synthetic resin; thus, the clutch is superior in vibration characteristics and acoustic characteristics.

Figure 13A:
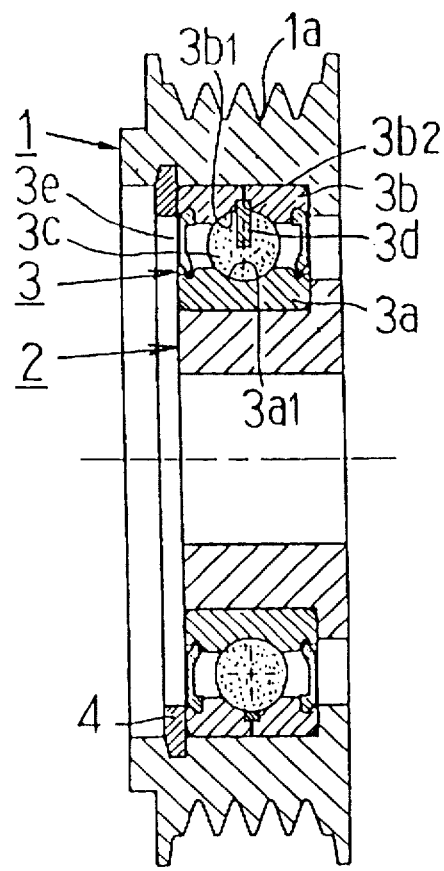
FIG. 13 is a longitudinal sectional view (FIG. a) of an alternator pulley according to another embodiment of the invention and a cross sectional view (FIG. b) of a one-way clutch.
Figure 13B:
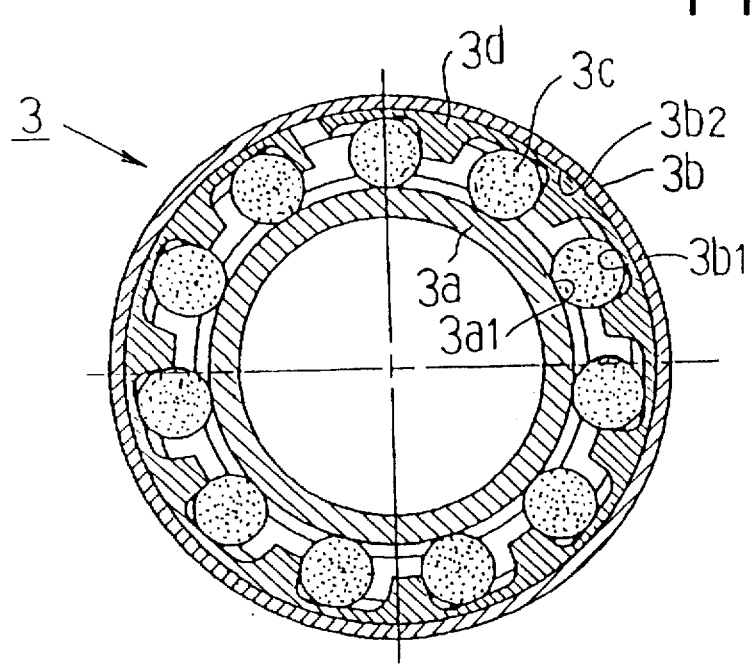

In an embodiment shown in FIG. 13, balls 3a are made of ceramic material. Since the contact between the balls 3c and the raceway surfaces 3b1, 3b2 and the contact between the balls 3c and the retainer 3d are ceramic material-to-metal contact, seizure between contact surfaces hardly occurs, as compared with contact between like metals. As a result, surface toughening due to seizure wear hardly occurs in the ball surface, raceway surfaces and cam surface, and hence the durability of the clutch is improved and degradation in the acoustic characteristics due to toughening of the contact surfaces hardly occurs. Further, the rare occurrence of seizure in the area of contact between the ball surfaces and cam surface results in the avoidance of cutting-in phenomenon (biting phenomenon) which takes place between the balls and the cam surface, thus making clutch function more reliable, particularly improving switching response from torque transmission to interruption.

The bearing ring (inner or outer ring) of the type in which the raceway surface makes angular contact with the ball at two points, as shown in FIGS. 7 or 10, can be produced by the following method. This will be described by taking as an example the outer ring 3d of the shape shown In FIG. 7.

Figure 14:
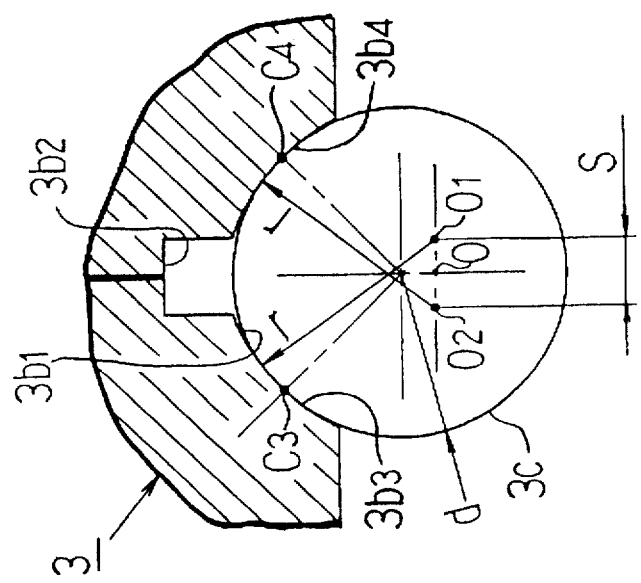
FIG. 14 is an enlarged sectional view showing the raceway surface of an outer ring.

As shown in FIG. 14, the raceway surface 3b1 of the outer ring 3b is drawned with two spherical surfaces 3b3 and 3b4 having a radius of curvature r with their centers of curvature located at points 01 and 02 mutually axially offset by a dimension S, making angular contact with the ball 3c at two points C3 and C4. The radius of curvature r is larger than the radius d of the ball 3c by a predetermined value (r>d). Further, the bottom of the raceway surface 3b1 is formed with a circumferential groove 3b2.

Figure 15A:
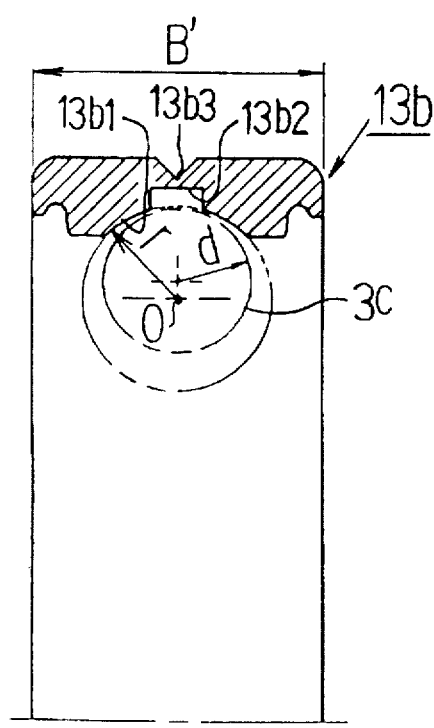
FIGS. 15(a) through 15(d) are views showing the process for manufacturing the outer ring shown in FIG. 14.
Figure 15B:
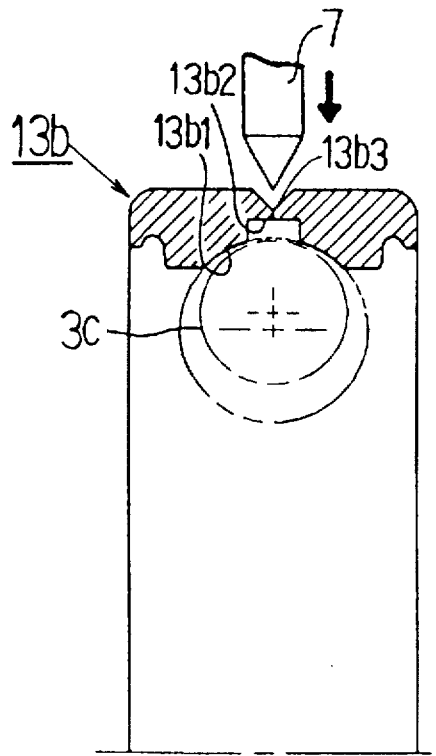
Figure 15C:
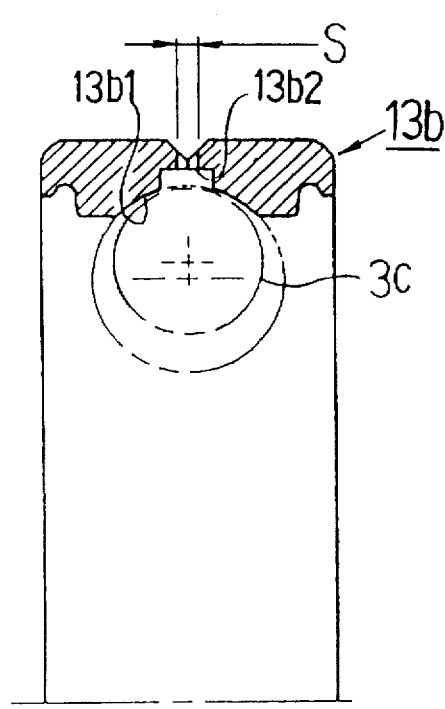

The outer ring 3b can be obtained from an outer ring blank 13b shown in FIG. 15(a) through the splitting step (FIG. 15(b)) and the lathing step (FIG. 15(c)). The outer ring blank 13b is produced such that the longitudinal section of the raceway surface 13b1 is drawn with a spherical surface (with the center of curvature located at point 0) having a radius of curvature r which is greater than the radius d by a predetermined amount and such that the width dimension B' is greater than the width dimension B of a finished article 3b (FIG. 15(d)) by a predetermined dimension S (B'−B=S). The processing of the raceway surface 13b proceeds to the final finishing (superfinishing) before entering into the splitting step. Since the raceway surface 13b1 of the outer ring blank is of single spherical surface, the method used for a outer rings of usual deep groove ball bearings can be used for this processing. And after the finishing of the raceway surface 13b1 has been completed, the circumferential groove 13b2 is formed, followed by the splitting step. In addition, a V-shaped notch 13b3 is provided in the split-expected position, i.e., axial center on the outer periphery of the outer ring blank 13b. This notch 13b3 is formed by forging (simultaneous forging for the blank shape as well) or lathing.

As shown in FIG. 15(b), in this splitting is employ splitting is employed as the splitting means. That is, a breaking tool 7 is applied to the notch 13b3 formed In the widthwise center of the outer periphery of the outer ring blank 13b and a pressure Is applied to the breaking tool 7 in the direction of arrow shown in the figure, thereby causing cracks in the bottom of the blank, splitting the outer ring blank 13b along the widthwise centerline.

After the outer ring 13b has been split, as shown in FIG. 15(c), the surface of each divisional part is lathed (or milled) by an amount (S/2) corresponding to the dimension S.

In the case where natural splitting is employed, as in this embodiment, the stock allowance for splitting is not required so that the sum total of the stock allowance for cutting is equal to the dimension S. In the case where cut-splitting is used as the splitting means, the dimensions S minus the stock allowance for splitting may be taken as the sum total of the cutting stock allowance.

Figure 15D:
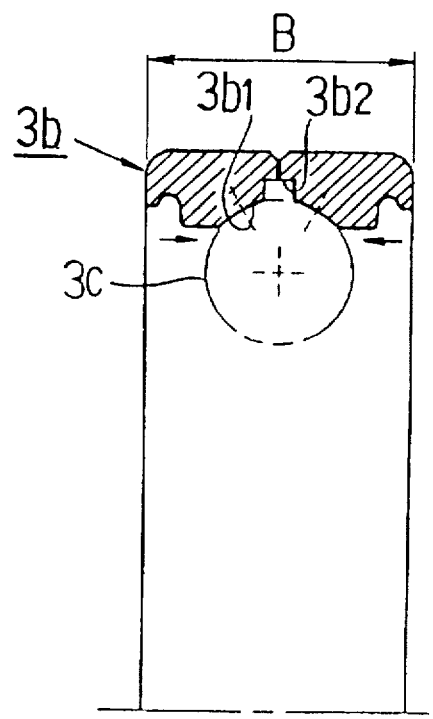

When the two divisional parts having the split surfaces lathed by an amount corresponding to the dimension S in the manner described above are put together, an integral outer ring 3b shown in FIG. 15(d) is obtained.

Generally, with the intention of applying axial prepressure, supporting the axial load, and decreasing the contact surface pressure, the raceway surface of the bearing ring for contact with balls at two points is sometimes shaped oval, spherical or V-shape. However, in connection with the finish treatment of a raceway surface, there is the following problem. That is, in the case where the raceway surface of a bearing ring, which is usually superfinished, has its longitudinal section usually drawn with a single spherical surface, as in the case of the inner and outer rings of a standard deep groove ball bearing, the entire area of the raceway surface can be superfinished while requiring only single tooling, by swinging the grinding stone along the axial curvature of the raceway. In the case where the longitudinal section of the raceway surface has been described with the above-mentioned shape, such superfinishing cannot be applied, making it necessary to resort to tumbler finishing or to leave it as ground. This leads to complication of the manufacturing process, sometimes falling to provide the required quality.

According to this embodiment, before splitting, the finish treatment of the raceway surface 13b1 of the outer ring blank 13b is finished; therefore, the finishing of the raceway surface can be effected by the same method as for usual deep groove ball bearings, whereby the manufacturing process can be simplified and the quality improved, as compared with the conventional case. In addition, this embodiment is applicable not only to the manufacture of the inner or outer ring of a one-way clutch but also to the manufacture of split type bearing rings in general having a raceway surface for contact with balls at two points.

The present invention is not limited to the arrangements exemplified above, and, for example, (1) the raceway surface may be formed directly on the inner periphery of a pulley body or the outer periphery of a shaft sleeve or the mating shaft, (2) other configurations (for example, one having no pillar portion) may be used as the retainer, (3) the retainer may be a complete ring having no slit (in this case, the required diameter expansion and contraction are effected by utilizing the material elasticity and shape elasticity of the retainer), and (4) the retainer may be mounted on the raceway surface of the inner ring or the like (it is advisable to provide the circumferential groove in the raceway surface on the side where the retainer is mounted; however, the present invention is not limited to the arrangement in which the retainer is fitted in the circumferential groove of the raceway surface). Further, the one-way clutch of the present invention is not limited to a belt transmission mechanism, such as an alternator pulley, and can be widely used for mechanisms in general for controlling the transmission or interruption of torque in one direction.

What is claimed is:

1. A one-way clutch comprising:
   an inner member having a raceway surface formed on an outer peripheral surface thereof;
   an outer member having a raceway surface formed on an inner peripheral surface thereof;
   a plurality of balls interposed between said raceway surfaces;
   a retainer in the form of a one-split ring fitted in said raceway surface of one of said members in a state of concomitant rotation with the one member, said retainer having cam surfaces cooperating with said raceway surface of the other member to define wedge clearances in one rotative direction;
   wherein in one rotative direction, because said balls are engaged with said wedge clearances, said members are locked together, and in another rotative direction, because said balls are disengaged from said wedge clearances, said members are relatively rotated to each other while supporting a load through contacts of said balls with said raceway surfaces, and wherein said engagements and disengagements of said balls with said wedge clearances are changed through said concomitant rotation of said retainer with the one member.

2. A one-way clutch as set forth in claim 1, wherein said retainer is fitted in a circumferential groove formed in said raceway surface of said one member.

3. A one-way clutch as set forth in claim 1, wherein said retainer comprises an annular element fitted in said raceway surface of said one member, a plurality of pillar portions extending from said annular element to the raceway surface of said other member, pockets each surrounded by said annular element and said circumferentially adjacent pillar portions and adapted to receive said balls, and a cam surface formed on a wall surface of said annular element on said pocket side and cooperating with said raceway surface of said other member to define a wedge clearance in one rotative direction.

4. A one-way clutch as set forth in claim 1, wherein the raceway surface of said one member has a shape to make angular contact with said rolling elements at two points.

5. A one-way clutch as set forth in claim 4, wherein a space for receiving said retainer is formed, said space is defined between a bottom of said raceway surface of said one member and said balls.

6. A one-way clutch as set forth in claim 1, wherein said one member is bisected in a section which is orthogonal to the axis.

7. A one-way clutch as set forth in claim 6, wherein said one member is said outer member, and said bisected outer member is held by a retaining ring.

8. A one-way clutch as set forth in claim 1, wherein said retainer is made of a synthetic resin.

9. A one-way clutch as set forth in claim 1, wherein said rolling elements are made of ceramic material.

10. A one-way clutch as set forth in claim 1, wherein said inner member, said outer member and said balls are components of a rolling bearing.

11. A method of producing a bearing ring serving as a member in a one-way clutch, comprising the steps of:

producing a bearing ring blank with a single spherical surface having a radius of curvature greater by a predetermined amount than a radius of a ball serving as a rolling element, wherein said bearing ring blank has a width greater by a predetermined amount than the width of a complete bearing ring; bisecting said bearing ring blank along a widthwise centerline thereof; and cutting a split surface of each divisional part by an amount corresponding to said predetermined amount.

* * * * *